July 12, 1927.

J. T. LITTLETON

SPARK PLUG

Original Filed April 25, 1921

1,635,186

Inventor
Jesse T. Littleton

By
Attorney

Patented July 12, 1927.

1,635,186

UNITED STATES PATENT OFFICE.

JESSE T. LITTLETON, OF CORNING, NEW YORK, ASSIGNOR TO CORNING GLASS WORKS, OF CORNING, NEW YORK, A CORPORATION OF NEW YORK.

SPARK PLUG.

Original application filed April 25, 1921, Serial No. 464,143. Divided and this application filed February 28, 1923. Serial No. 621,767.

This application, which is a division of my application Serial No. 464,143, filed April 25, 1921, which issued as Patent 1,525,453, dated Feb. 10, 1925, relates to a new and useful construction of spark plugs for explosive engines, the object had in view, being the construction of a plug in which the glass used as a material from the insulating core, is formed and shaped around the central electrode. In spark plugs of this type, it is important to provide for a tight seal between the metallic and glass parts, which will not open under pressure, and variations of temperature to which the parts are subjected in use, and which will not cause, under the same conditions, strains sufficient to break the glass core. In addition to the above, the plug must possess high mechanical and electric strength and heat-resisting properties.

The nature of the problem which is to be solved, will be rendered more plain by a consideration of the following facts,—

The thermal endurance of the glass or cause, must be low. In brief, a glass whose linear co-efficient of expansion is as low as .0000033 per degree C. is employed.

Metal, such as commonly used for heating having a linear co-efficient of expansion as high as .000012.

The sparking point of the central electrode, and the heating near its top, may reach in use a temperature as high as 500°–800° C.

The compression within the engine, and thus the pressure tending to cause breakage through the plug, may run as high as 700 pounds to the square inch. These temperatures and pressures render it necessary to avoid the use of fusible cement and glazing, in uniting glass and metallic parts, and to so dispose the parts, that strains, due to heating and cooling, are avoided as much as possible, or so located and directed that their harmful effect is counter-acted or reduced. This invention further consists in the several features hereinafter pointed out and claimed.

Referring to the accompanying drawings,—

Figure 1:
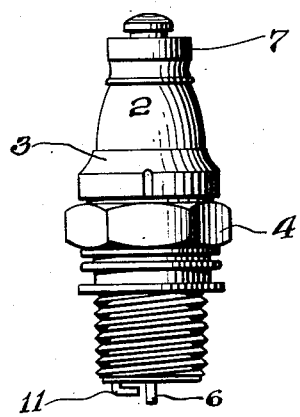
Figure 1 is a side elevation of one form of the spark plug embodying this invention.

While in the drawings of this invention I have shown a spark plug which is molded in the band 3, the invention applies equally as well to a spark plug in which these parts are otherwise assembled.

Figure 2:
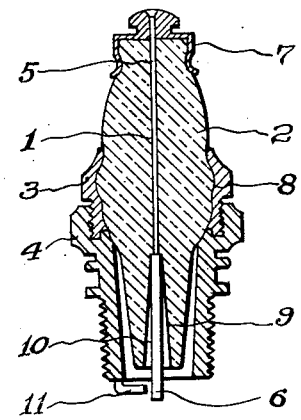
Figure 2 is a vertical section therethrough.
Figure 4:
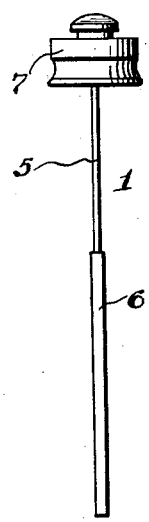
Figure 4 is a view in elevation of the central electrode, and cap.
Figure 3:
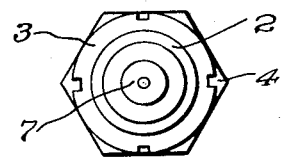
Figure 3 is a plan view thereof.

As shown in Figures 1 and 2, the improved spark plug forming the subject-matter of this application, comprises a central electrode 1, a core 2, and glass molded around the electrode and inside of a metallic band 3, a shell member 4 to which the band is screwed, and which is adapted to be screwed into the engine cylinder. The electrode 1 consists of an upper portion 5, of relatively small diameter, which is preferably formed of some low expansion metal that can be sealed into the glass of which the core 2 is made. Molybdenum or tungsten are suitable for this part. However, as these metals break down when used as sparking points, the lower portion 6 of the electrode is preferably made enlarged in cross section to retain heat, and of some metal which stands up under the conditions to which the spark points are subjected. The nickel manganese alloys now in common use are suitable for this part of the electrode, the two parts of the electrode being welded, or otherwise firmly secured together. A wiring terminal in the form of a cap 7 is shown as firmly fastened to the upper end of the electrode portion 5, but as the invention is not directed to the terminal connection of a spark plug, I wish it understood that any form of terminal connection can be used. The core 2, is, by preference, formed of glass designated as $B_2$, in U. S. patent to Sullivan & Taylor, No. 1,304,623, of May 27, 1919, having a linear coefficient of expansion of .0000033 per degrees C. The external condition of the core may closely approach, or be identical with the standard practice, including the conical sleeve 9 at the tip, whereby a free space is left around the tip and inside the shell skirt. An expansion space 10 is formed in the sleeve, around the nickel manganese alloys sparking point 6 of the central electrode, to prevent the cracking of the core 2 by the expansion of the point, which is considerable, under the high temperature present in use, as such alloys have relatively high expansion. This space at this point, is of greater importance, due to the fact that the tapered form of the sleeve 9 (which is desirable to prevent the deposit of carbon, and thereby causing short circuiting), reduces the resistance of the core to fracture from tensile strain. For this reason, the space 10 should extend back into the core for a considerable distance, and preferably, to the joint between the two sections of the electrode. The variations of the temperature at such point are not as extensive as at the tip, and the strength of the core due to its greater cross section, is greater. The junction between the two sections of the central electrode should also be sufficiently removed from the tip of the plug not to melt from the heat of the engine.

The shell 4 and the spark point 11 carried thereon, may be of any improved construction.

Having thus described the invention what I claim as new, and desire to secure by Letters Patent is,—

1. A spark plug comprising a glass core and an electrode composed of a plurality of axial sections of different materials, one of which is of a material having a low coefficient of expansion, and is sealed to the core, and the other of which is of material resistant to destruction by arcing and is contained within, but not sealed to, the core.

2. A spark plug comprising a glass core and an electrode, the upper portion of the electrode being of low expansion material, and being sealed to the core, and its lower portion being of material resistant to destruction by arcing and contained in an expansion chamber in the lower end of the core.

3. A spark plug comprising a core and a two-piece electrode, one end of the electrode being of low expansion material sealed to the core, while the other end is of material resistant to destruction by arcing and is contained within a cavity within the tip of the core.

4. A spark plug comprising a core, and an electrode, the upper portion of the electrode being of small diameter and of low expansion material and sealed to the core, and the lower portion being of larger diameter and contained within an expansion chamber in the lower end of the core.

In testimony whereof I hereunto affix my signature.

JESSE T. LITTLETON.